March 21, 1961 E. F. CLARK Re. 24,949

METHOD OF AND APPARATUS FOR WEAVING

Original Filed Dec. 6, 1944 7 Sheets-Sheet 1

Inventor:
Eugene F. Clark:
By: Wilkinson Huxley Byron & Knight
Attys.

March 21, 1961 E. F. CLARK Re. 24,949

METHOD OF AND APPARATUS FOR WEAVING

Original Filed Dec. 6, 1944 7 Sheets-Sheet 2

Inventor:
Eugene F. Clark.
By: Wilkinson Huxley Byron & Knight
Attys.

March 21, 1961 E. F. CLARK Re. 24,949

METHOD OF AND APPARATUS FOR WEAVING

Original Filed Dec. 6, 1944 7 Sheets-Sheet 3

Inventor:
Eugene F. Clark
By Wilkinson Huxley Byron & Knight
Attys.

March 21, 1961 E. F. CLARK Re. 24,949
METHOD OF AND APPARATUS FOR WEAVING
Original Filed Dec. 6, 1944 7 Sheets-Sheet 4
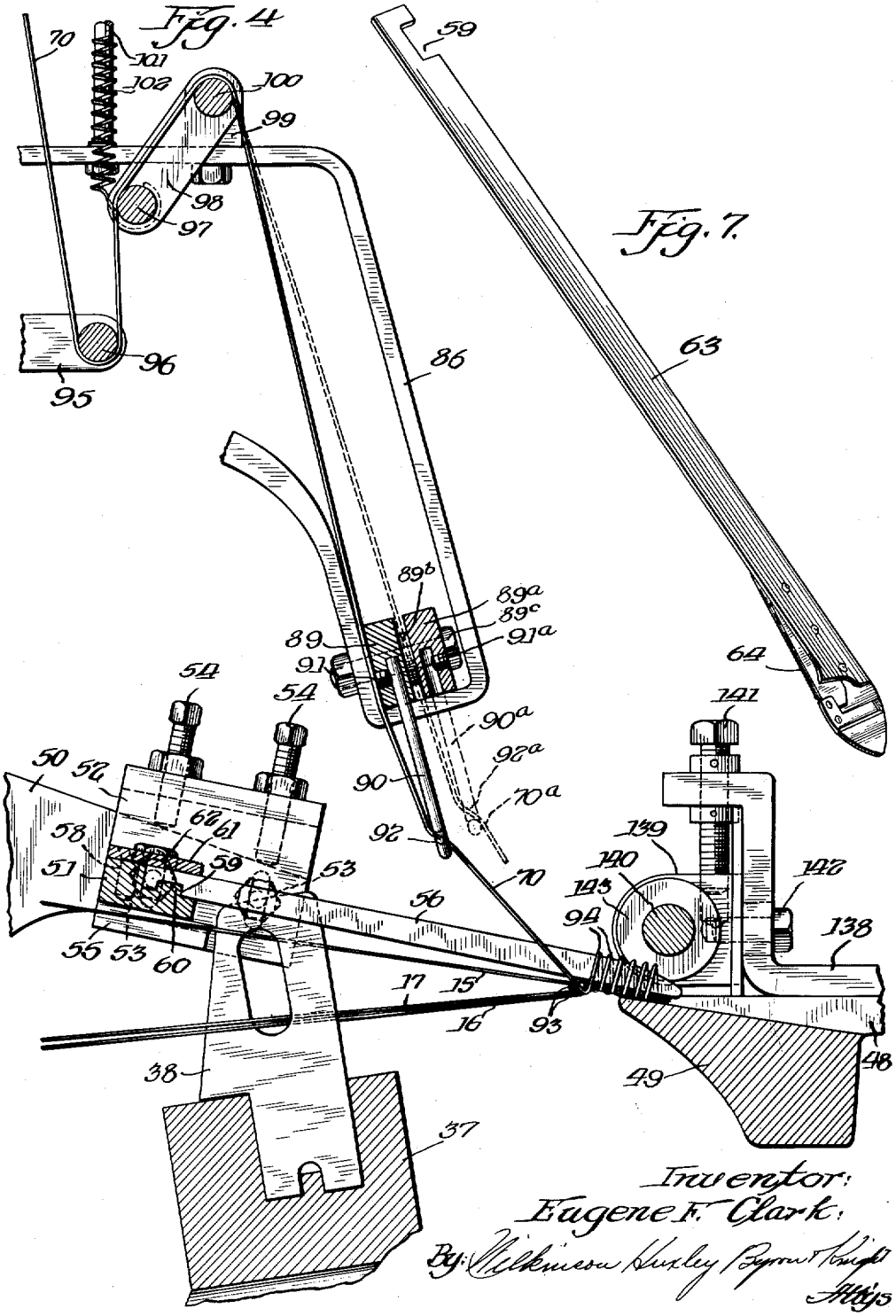
Inventor:
Eugene F. Clark,
By: Atkinson Hurley Payne & Knight
Attys METHOD OF AND APPARATUS FOR WEAVING
Original Filed Dec. 6, 1944 7 Sheets-Sheet 5
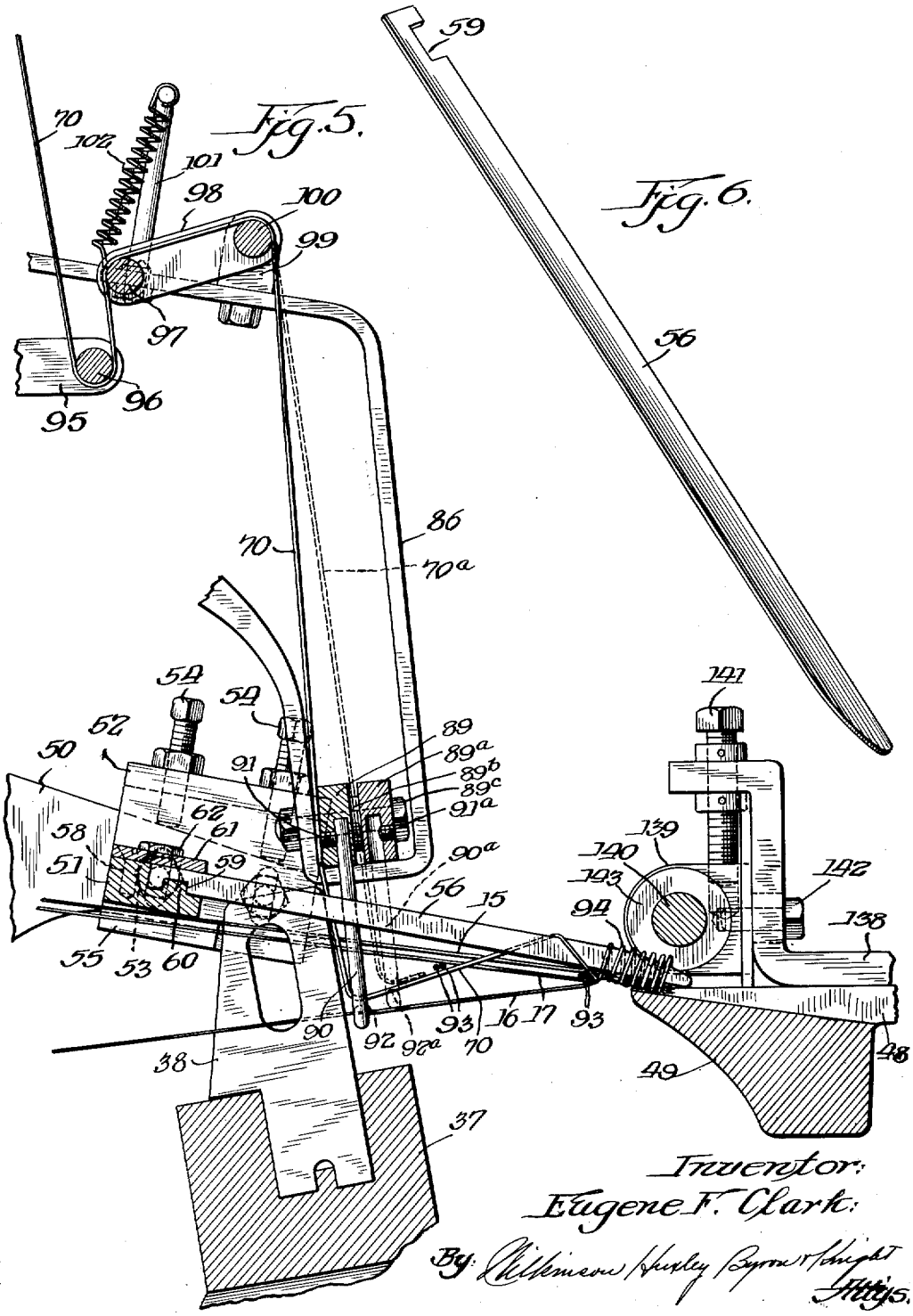

METHOD OF AND APPARATUS FOR WEAVING
Original Filed Dec. 6, 1944 7 Sheets-Sheet 6
Fig. 8.
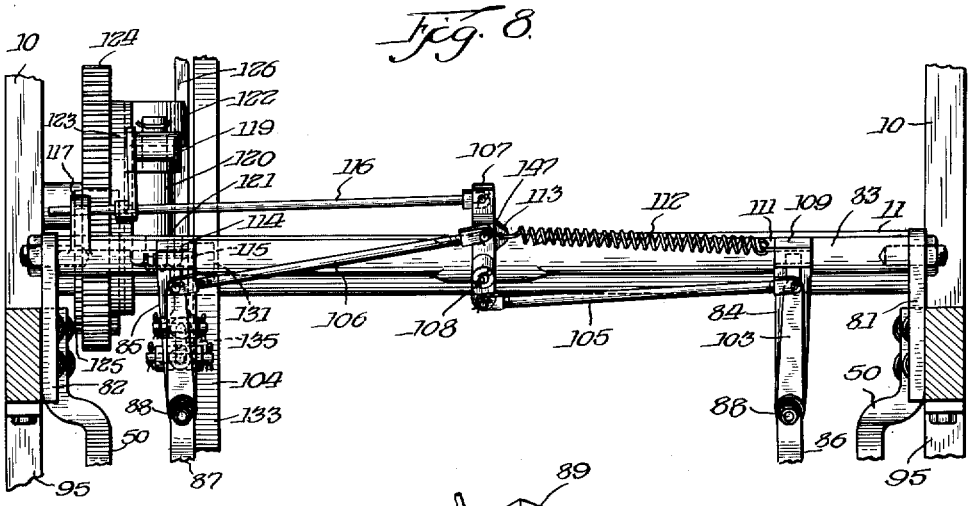
Fig. 9.
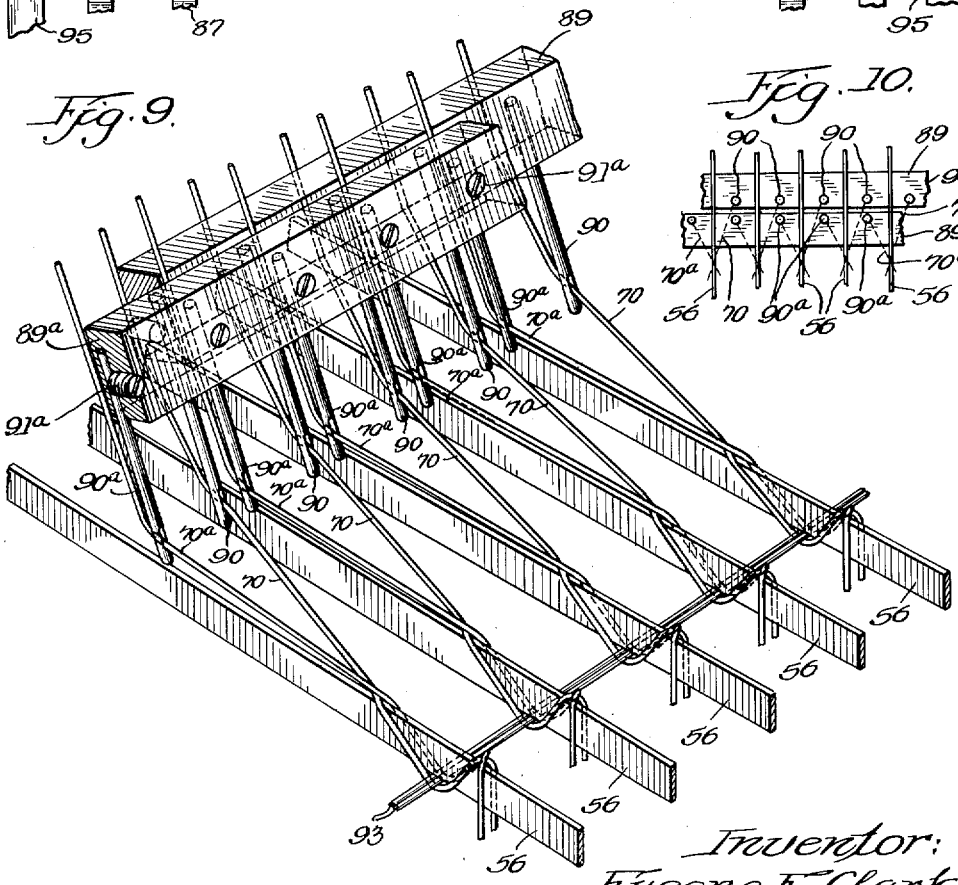
Fig. 10.
Inventor:
Eugene F. Clark:
By: Wilkinson Huxley Byron & Knight
Attys.

METHOD OF AND APPARATUS FOR WEAVING

Original Filed Dec. 6, 1944 7 Sheets-Sheet 7

Inventor:
Eugene F. Clark:
By: Dickinson Hubley Byron & Knight
Attys.

United States Patent Office

Re. 24,949

Reissued Mar. 21, 1961

24,949

METHOD OF AND APPARATUS FOR WEAVING

Eugene F. Clark, Leaksville, N.C., assignor, by mesne assignments, to Fieldcrest Mills, Inc., a corporation of Delaware Original No. 2,437,378, dated Mar. 9, 1948, Ser. No. 566,853, Dec. 6, 1944. Application for reissue June 16, 1960, Ser. No. 36,698

45 Claims. (Cl. 139—46)

Matter enclosed in heavy brackets [ ] appears in the original patent but forms no part of this reissue specification; matter printed in italics indicates the additions made by reissue.

My invention relates to an improved method of and apparatus for weaving, preferably for the weaving of heavy pile fabrics used for rugs and carpets and the like, as well as draperies, and tapestries, and may also be used for terry cloth used in the manufacture of bath towels, bath mats, and the like.

The primary object of my invention is the provision of mechanism incorporated in a loom for the weaving of pile into fabrics independently of any of the apparatus for the weaving of the fabric base in a continuous process, with the warp taken from warp beams in the usual manner with filling threads woven with the warp threads to form the backing, while the pile is formed from continuous strands of yarn taken from a beam, spools, banks or creels and woven into the fabric initially in the form of loop pile, formed by means of guides which thread the yarn back and forth over fingers which extend warpwise of the loom in front of the harnesses and between the fingers into the shed of the loom where the filler threads are inserted through the open warp and loops and beat up into fabric.

I am aware that in the art of weaving, fingers or wires extending warpwise of the loom in combination with doup heddles or harness have been employed for the weaving of certain kinds of fabrics, usually light weight, as compared with carpets, and in which wires, fingers or gauges are used which usually extend through the harness, which confines the use of looms of this type to very narrow limits, usually to open fabrics or loosely woven fabrics. Also, for the weaving of heavy fabrics, wires or guides extending fillerwise of the loom have been employed, but both of these types are objectionable because of the difficulty of handling doup needles and the insertion and removal of the fillerwise guides. In my improved loom I am able to weave heavy and close woven pile fabric very rapidly and very accurately with varying kinds and types of pile yarn and in which the pile yarn is accurately and firmly woven into the base fabric and in such nearly perfect condition that it requires very little burling and very little trimming, so that a saving in time and labor is secured as well as a substantial saving in material, which is not true with respect to some of the other forms of weaving.

Another and further object of my invention is the provision of a loom having spaced fingers extending parallel with the warp, mounted in front of the harness and independent in operation therefrom, over which strands of pile yarn are woven into loops fairly tightly while anchored in the fabric and the base fabric and the loops thus formed moved along the fingers by the beating-up action of the loom and over the free ends of the fingers, if loops are desired, and severed through the crown of the loops by knives mounted along the upper sides of the fingers adjacent the ends to form the usual pile, with from three to five loops normally being on the fingers at all times to form a backing against which the succeeding loops are beat, thereby providing a heavier pile more closely woven and evenly formed than is possible heretofore.

Another and further object of my invention is the provision of a loom in which any and all kinds of materials such as wool, worsted, cotton, jute, rayon, and nylon yarn and combinations thereof may be used, with particular emphasis placed upon cotton yarn, which is especially difficult to weave properly into pile fabric, and in which plain or all-over fabrics in color or design and various combinations thereof can be woven or various patterns may be woven, particularly through the use of spot dyeing now common with many types of weaving, if desired.

Another and further object of my invention is the provision of a loom in which the pile may be fashioned to any height desired or with tight or closely woven pile or loosely woven if desired with the usual variety of picks or ends, as may be desired, and in which plain back or woven through to the back fabrics may be woven with the placing of shots of filler threads in many combinations, and also for the weaving of various kinds and types of fabric now commonly used in the making of shag rugs and carpets and the like.

Another and further object of my invention is the elimination of waste in the weaving operation in that all of the material is incorporated in the finished pile, whereas in the normal cutting of the pile yarn in the ordinary weaving there is usually a large amount of waste, all of which is saved through the use of my improved loom, as there is no waste in the weaving operation.

Another and further object of my invention is the provision of a loom in which the burling and finishing operations are materially reduced, in some of the operations as much as one-half.

Another and further object of my invention is the provision of the combination of fixed fingers free of the harness, and sets of pile yarn guides, movable fillerwise in combination with raising and lowering means therefor, all of which is independent and free of all other operating parts of the loom but operate in synchronism therewith for the weaving of the pile into the fabric, the sets of guides being shifted together if desired or independently in opposite directions for the production of various kinds of pile, color combinations of pile, and various texture effects, thereby retaining control of the strands of pile yarn at all times.

Another and further object of my invention is the provision of a loom for the making of pile fabrics in which the strand of yarn forming the pile is retained under control and under such tension as may be desirable at all times, until it becomes an integral part of the fabric, and at no time are there any loose or free ends of the pile yarn such as is the case in some of the practices heretofore followed in the weaving of pile fabrics.

Another and further object of my invention is the provision of pile weaving apparatus which operates independently of the warp handling apparatus of the loom and without regard to the number or spacing of the warps and in which the operation of the loom is very much faster and more accurate than what is possible at the present time.

Another and further object of my invention is the provision of a loom in which double looped pile is woven through the use of two pile yarn guide bars, which, when yarn of contrasting colors is looped together, presents a fabric of unusually attractive appearance and in which exceeding coarse pile yarn may also be used, thus increasing the speed of weaving and producing a tight, heavy pile having long wearing qualities.

These and other objects of my invention will be more fully and better understood by reference to the accompanying sheets of drawings, and in which—

Figure 4 is a detail side elevational view of the pile weaving mechanism showing the upper position of the pile yarn insertion guides and showing two pile yarn guide bars with pile yarn guides, one in dotted position.

Figure 5 is a detail side elevational view of the pile weaving mechanism showing two pile yarn guide bars, the front guide being in dotted position, with the guides extending into the shed of the loom.

Figure 6 is a perspective view of one of the pile forming fingers for loop pile.

Figure 7 is a perspective view of a finger used in forming and cutting the loops of the pile.

Figure 8 is a top plan view of a portion of the guide bar shifting means which is arranged to shift the guide bars in opposite directions.

Figure 9 is a diagrammatic expanded perspective view showing two pile guide bars with front and rear guides for the weaving of double or crossed loop pile.

Figure 10 is a bottom plan view on a reduced scale of the apparatus illustrated in Fig. 9.

Figure 1:
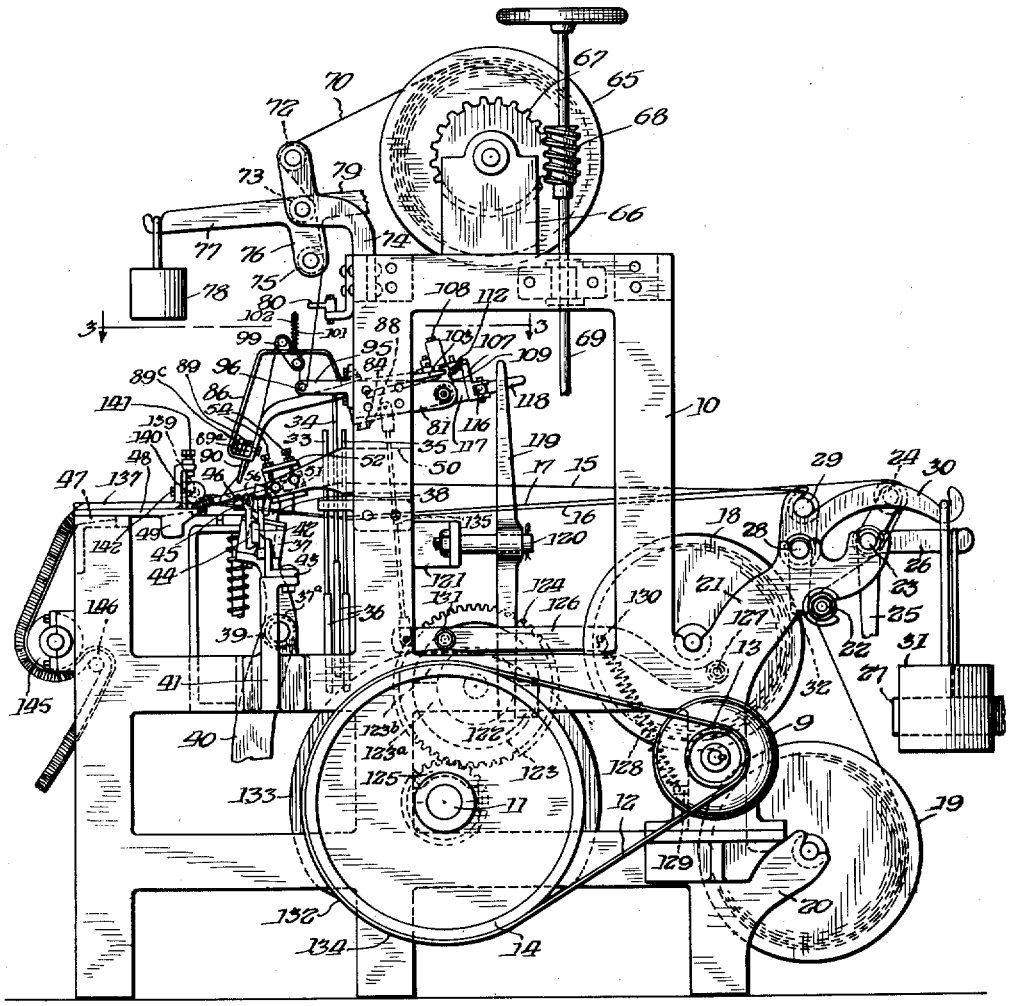
Figure 1 is a side elevation of a loom embodying my invention, the side of the machine illustrated being on the right side of the operator of the loom.

Referring specifically to the drawings and in which like reference characters refer to like parts throughout, a main frame 10 is shown generally rectangular in shape upon which all of the operating parts are mounted for weaving purposes. The loom as illustrated is adapted to produce a pile securely woven into a base fabric and it is the weaving of the pile with which my invention has particular reference, with the apparatus for weaving the base fabric being old in the art and forming no part of my present invention.

A motor 9 is mounted on the frame 10 for supplying power for the operation of the loom, having any form of power transmitting means to the main drive shaft 11 of the loom mounted in the frame 10, such as a belt 12 extending over a pulley 13 on the motor shaft and a pulley 14 on the end of the main drive shaft 11.

Figure 13:
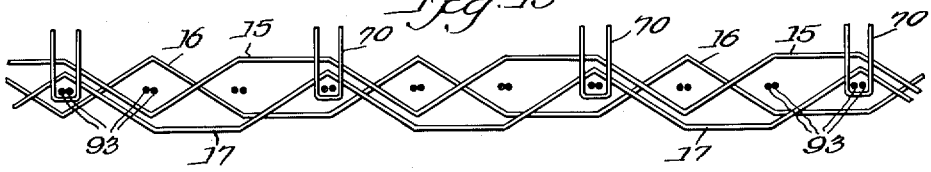
Figure 13 is an expanded diagrammatic view of one of the fabrics produced with a single set of pile insertion guides.
Figure 14:
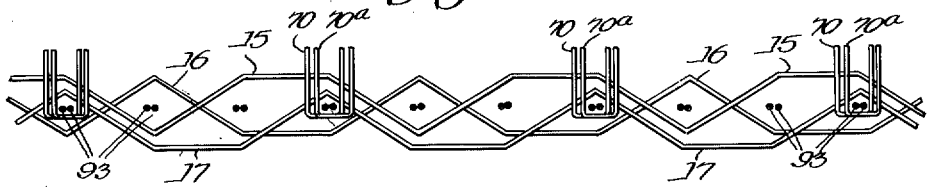
Figure 14 is an expanded diagrammatic view of one of the fabrics produced with the multiple set of pile guides.
Figure 11:
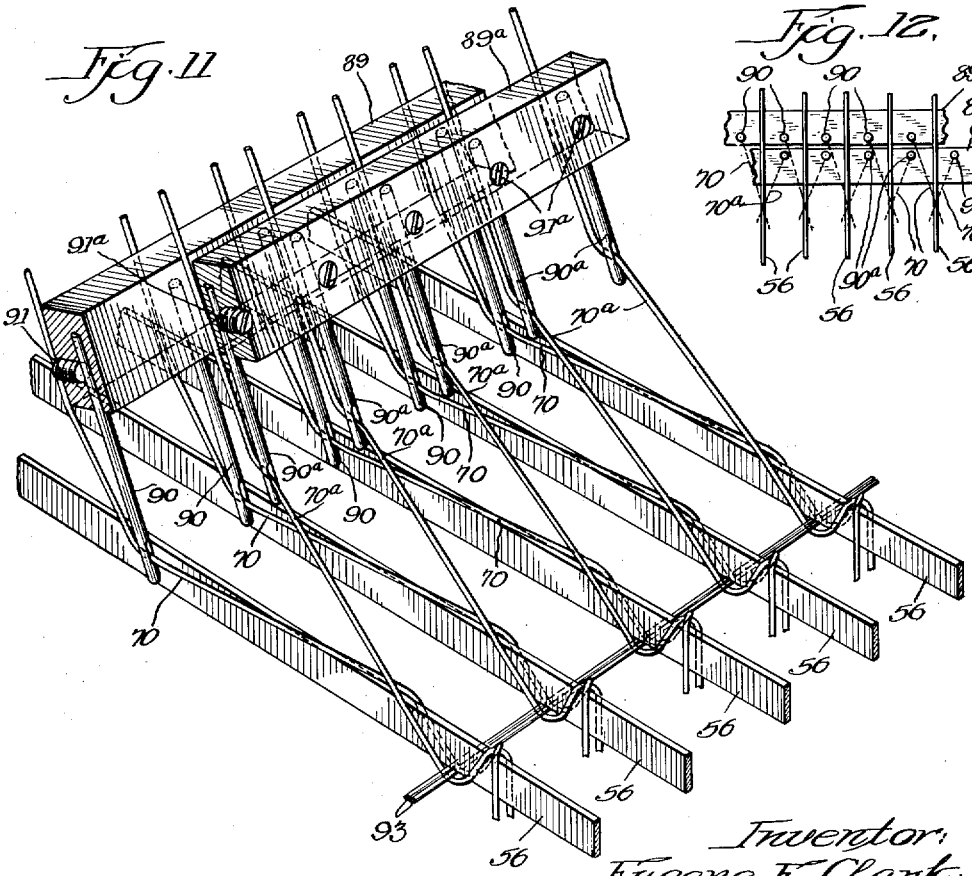
Figure 11 is a diagrammatic expanded view similar to Fig. 9 with the pile guide bars shifted to a position opposite to that shown in Fig. 9.
Figure 12:
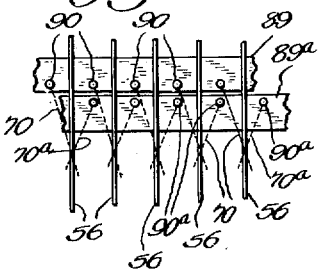
Figure 12 is a bottom plan view in a reduced scale of the apparatus in the position shown in Fig. 11.

The pile fabric base is woven of the usual warp and filler preferably of a series of groups of warp threads usually three in number as illustrated in Figures 13 and 14 such as 15, 16, and 17, with a beam 18 carrying the warp threads 15 and 16, and a beam 19, on arms 20, 20 of the main frame 10, carrying the warp threads 17, although many combinations and variations of weave are possible through the operation of the harness through which all the warp passes. Arms 21, 21 are provided on the outer end of which is a fixed roll 22 and snap rolls 23 and 24 around which the warp threads 17 pass with an arm 25 which is connected to let-off and take-up mechanism (not shown because this mechanism is well-known in the art and does not form any part of my present invention). An arm 26 is provided from which a weight 27 is suspended which serves to apply tension to the warp yarn 17. Intermediate the ends of the arms 21, 21 is a pair of snap rollers 28 and 29 with an arm 30 being provided from which a weight 31 is suspended by means of which the warp 15 and 16 is kept under tension with an arm 32 leading to the let-off mechanism of the loom. Harnesses 33, 34, and 35 of the usual form are shown and through which the warps 15, 16, and 17 are threaded, which have rods 36, 36 connected thereto which lead to suitable cams on the drive shaft 11, commonly used in looms of this character and not shown in the drawing because they form no part of my present invention. A reed or beating means is provided comprising a box 37, having reed dents 38, 38 mounted thereon with openings therein through which the warps 15, 16, and 17 are threaded. The reed box 37 is operated by rocker arms 37a, 37a mounted on a shaft 39 in brackets on the frame 10 in the usual manner and operated by a lever 40 connected with a cam on the drive shaft 11 through proper linkage, all of which is common in loom construction.

At one side (Figure 1) of the loom is a frame 41 upon which a needle track 42 is mounted by means of angles 43 with a needle carriage 44 slidably mounted on the track 42 with a needle 45 being secured at its rear end to the needle carriage 44 and passing through a fixed guide 46 mounted on the track 42 with the usual operating mechanism for passing the needle 45 fillerwise of the loom for the insertion of the filler threads between the warps or "making the shot" as it is known in this particular kind of weaving. A breast beam 47 is provided transversely of the frame 10 at the front thereof with brackets 48, 48 being provided to which a breast plate 49 is fastened for the support of the fabric after it has been woven. The apparatus thus far described has long been in use and is well known and understood in the art, and if desired will function to weave complete fabric which in effect is the foundation fabric of carpets, rugs, and the like.

My particular invention has to do with the incorporation of the pile yarn in the fabric during the process of weaving the fabric, either the form of loops or cut pile as desired. If cut pile is desired, then the loops are severed by knives mounted in the fingers over which the pile loops are initially formed during the weaving of the fabric. Brackets 50, 50 are secured to the frame 10 at each side thereof and support a fillerwise extending finger holding bar 51 secured to the lower horizontal flanges of Z bars 52, 52 mounted upon the brackets 50, 50 by means of bolts 53, 53 which extend through slots in the Z bars 52, 52 to provide for angular positioning of the finger holding bar 51, this adjustment being made by screws 54, 54 extending through the upper horizontal flange of the Z bars 52, 52 and into engagement with the upper edges of the brackets 50, 50. The finger holding bar 51 is mounted upon horizontal flanges 55, 55 of the Z bars 52, 52 at the lower sides thereof and forward of and entirely free of harnesses 33, 34, and 35, and has a plurality of spaced fingers 56, 56 mounted therein and extending forward therefrom with their free ends terminating over the breast plate 49.

The fingers 56, 56 at their rear ends, have recesses 59, 59 therein and are fitted over a rib 60 formed in the bar 51 and are spaced from each other by being seated in slots formed in the forward edge of the bar 51 with a cap 61 extending across the top of the bar 51 and secured thereto by means of screws 58, 58. The bar and finger assembly is held in position on the Z bar brackets 52, 52 by means of cap screws 62, 62.

The fingers 56, 56 are of two kinds as illustrated in detail in Figures 6 and 7 of the drawings. Fingers 56, 56 having tapered ends are used for the weaving of fabrics with loop pile. When it is desired to produce fabric having the usual cut pile, fingers 63 are used, each of these fingers 63 each having its free end slotted and a knife 64 inserted therein, which severs the loops as they are pushed into engagement with the knives 64, 64 during the weaving of the fabric.

A pile yarn beam 65 is mounted on the top of the loom frame by brackets 66, 66 with a gear wheel 67 on the beam shaft in engagement with a worm 68 on a shaft 69 leading to the let-off and take-up mechanism theretofore referred to as being common to all looms of this character. The pile yarn 70 passes over a snap roller 72, a fixed roller 73 mounted in brackets 74, 74 secured to the frame 10, while a roller 75 pivotally mounted in arms 76, 76 applies tension to the yarn 70 by means of an arm 77 having a weight 78 thereon, with another arm 79 leading to the take-up and let-off mechanism. The yarn 70 is passed through an open reed 80 which acts as a spacing means for the yarn and into the pile insertion guides presently described.

Brackets 81 and 82 are secured to the frame 10 on each side thereof, upon which a rocker member assembly is mounted comprising a shaft 83 having arms 84 and 85 adjacent each end thereof and extending radially therefrom, upon which arms 84 and 85 the guide bar members or frames 86 and 87 are pivotally mounted for lateral movement by means of bolts 88, 88 which pass through the guide bar members 86 and 87 intermediate their ends.

The front lower portions of these guide bar members 86 and 87 are generally rectangular in shape, extend outward towards the front of the loom and have guide bars 89 and 89a mounted therein in side by side relation with spacers 89b therebetween and fixed to the members 86 and 87 by means of studs 89c and 89d, each of which is fixed in one of the guide bar members 89 and 89a and extends through an elongated opening in the other bar so these bars 89 and 89a are movable relative to each other and slide on the spacers 89b through which each of the studs 89c and 89d extend. For example, the stud 89c may be fixed in the bar 89 and extend rearwardly through a hole in the guide bar member 86 and forwardly through the spacer 89b and through an elongated opening in the guide bar 89a with a nut loosely positioned on the forward end of the stud 89c so that the guide bar 89 will be moved laterally by the guide bar member 86, and the stud 89c will slide in the elongated opening in the guide bar 89a. At the opposite end of the guide bars 89 and 89a the stud 89d will be fixed in the guide bar 89a and extend through an elongated opening in the bar 89 and be secured to the guide bar member 87. This particular arrangement may be reversed if desired, but in any event the movement of the guide bars 89 and 89a is independent of each other and actuated by the guide bar members 86 and 87 fillerwise of the loom.

A plurality of spaced guides 90, 90 are mounted in the guide bar 89 by screws 91, 91 each of these guides 90, 90 having eyelets 92, 92 therein adjacent to the ends thereof through which the strands of the pile yarn 70 are threaded. A plurality of guides 90a also having eyelets therein are mounted in the guide bar 89a by means of screws 91a, the guides 90a being normally in warpwise alignment with the guides 90 and are slightly shorter than the guides 90, 90 and have additional pile threads 70a threaded therethrough, which may come from the pile beam 65 or from any other suitable source of supply and pass between the guide bar members 89 and 89a to the rear of the guides 90a and are threaded forwardly therethrough. The guides 90, 90 are spaced in relation to the fingers 56, 56 and are adapted to pass between the fingers 56, 56 in front of the reeds 38, 38, and carry the pile yarn 70 below the fingers 56, 56 and into the shed of the loom, so that the needle 45 passes through the loops of pile yarn 70 thus formed and positions double filler threads 93, 93 between the warp threads and over the strands of pile yarn 70 (Figure 5), below the fingers 56 when loops 94 of a single strand are desired. If desired, the additional guides 90a are used with the pile yarn 70a threaded therethrough, thereby producing double loops if the guides 90 and 90a are shifted in the same direction, and crossed pile loops, if the guide bars 89 and 89a are shifted in opposite directions in relation to each other, as will be hereinafter described.

Extending transversely across the front of the loom and mounted in brackets 95, 95 is a roller 96 around which the strands of pile yarn 70 and 70a (if two strands of pile yarn are used) pass with a second roller 97 being provided in links 98, 98, which in turn lead to brackets 99, 99 on the frames 86 and 87 and within which a roller 100 is mounted. Studs 101, 101 having inturned ends are mounted in the frames 86 and 87 and have springs 102, 102 secured to said inturned end portions which are anchored at one end on the studs 101, 101 and at the other end are connected to the links 98, 98 so that the strands of pile yarn are kept under tension at all times and all slack is kept out of the yarn during the operation of the guides 90, 90 in handling the pile yarn during the weaving operation.

Figure 3:
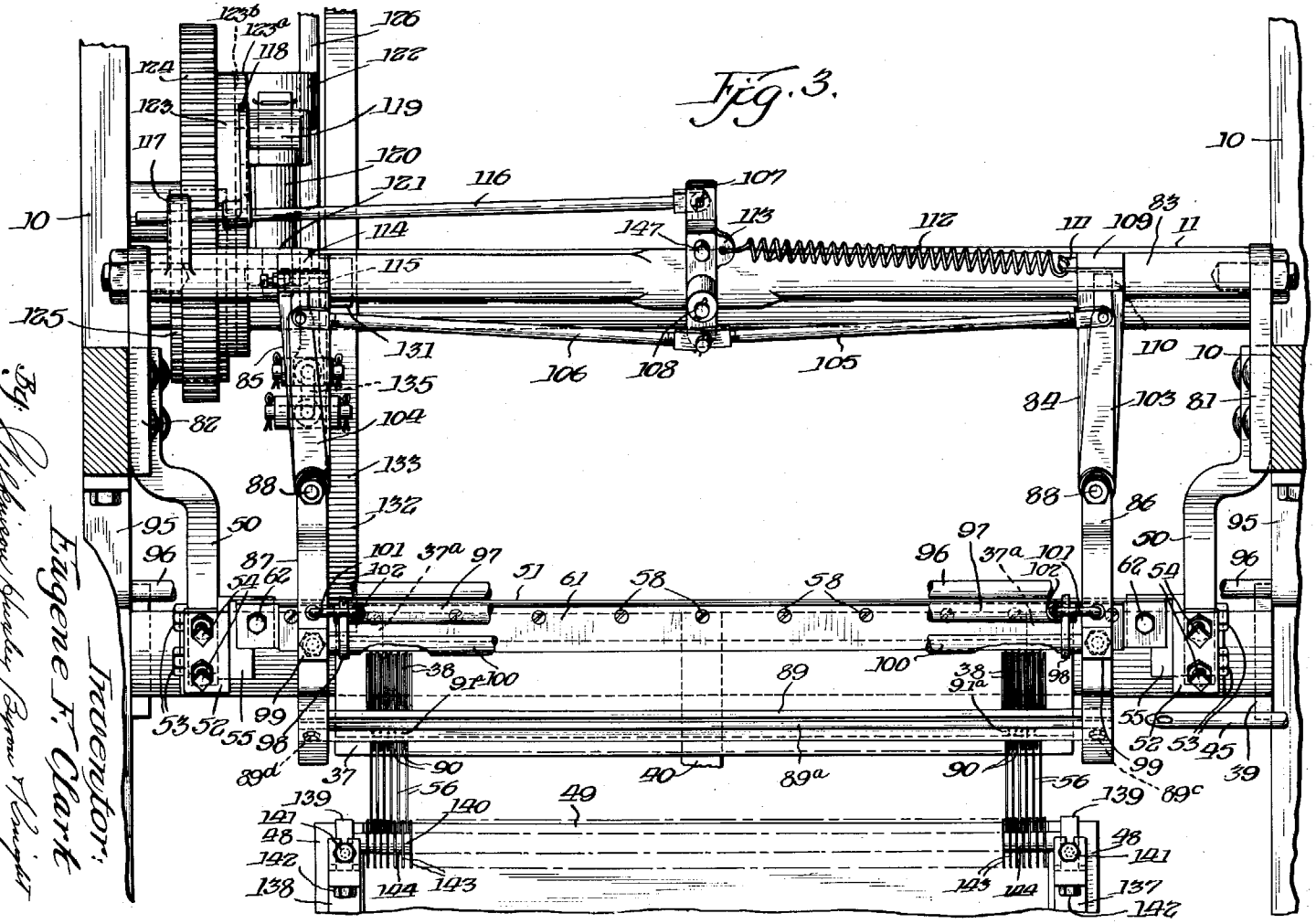
Figure 3 is a plan sectional view on lines 3—3 of Figure 1 with some of the pile inserting guides and fingers being omitted and showing the pile guide bar shifting means.

The lower portions of the members 86 and 87 have arm portions 103 and 104 which extend rearwardly from the bolts 88, 88 and have cross rods 105 and 106 secured thereto adjacent the rear ends thereof, these rods 105 and 106 being pivotally connected to a Z-shaped link 107 which is pivotally mounted on a pin 108 which projects upward from the rocker shaft 83 centrally thereof. A lug 109 extends upward from the rocker shaft 83 adjacent one end thereof, and has a guideway 110 therein, within which the rear end of the member 103 extends and moves during the lateral movement of the members 86 and 87. The lug 109 has an ear 111 thereon, to which a spring 112 is attached which is connected to an ear 113 at the side of the Z member 107, the force of the spring 112 being exerted upon the Z member 107 to normally turn the Z member 107 in a clockwise direction, when considering Figure 3 of the drawing. A lug 114 is provided adjacent the opposite end of the rocker shaft 83 with a guideway 115 therein for the rear end of the member 104, the lugs 109 and 115 forming supports also for the rear ends of the members 103 and 104 and assisting with the bolts 88, 88 in supporting the members 86 and 87.

A cross-rod 116 slidably mounted in a lug 117 rearwardly extending from the rocker shaft 83 is connected to the rear projecting portion of the Z member 107 and has an arm 118 thereon which is engaged by a pivotally mounted vertical lever 119 mounted upon an axle 120 in a bracket 121 which is secured to the frame 10 of the machine in any approved manner. The lever 119 has a roller 122 on the lower end thereof in engagement with a face cam 123 formed integrally with a gear wheel 124 and which in turn meshes with a second gear wheel 125 on the main drive shaft 11 of the loom.

During the operation of the loom the lever 119 is oscillated by the roller 122 in engagement with the cam 123 which has high cam face 123a and a low cam face 123b causing the upper end of the lever 119 to move in a counter-clockwise direction when considered from the standpoint of the operator in front of the loom which, in turn, moves the Z member 107 about its pivot point against the force of the spring 112 and through the arms 105 and 106, shifts the members 86 and 87 in proper alignment to insert the guides 90, 90 alternately on each side of the fingers 56, 56 each guide being alternately shifted to each side of its co-operating finger so as to form single loops 94, 94 in the fabric from the pile yarn 70. When desired to weave pile fabrics with double loops, the guide bar 89a has the guides 90a fitted therein and additional strands 70a of pile yarn are provided from any suitable source of supply, with the members 86 and 87 and guide bars 89 and 89a operating together in a unit movement, thereby forming double loops in the fabric with the filler 93 being inserted through both loops instead of only one when a single set of guides is used.

A horizontal lever 126 is pivotally mounted to the frame 10 of the loom at its rear end by means of a bolt 127 and has a spring 128 connected thereto which is attached to a lug 129 on the frame 10 of the loom, the opposite end of this spring 128 being secured to the lever 126 by a pin 130. A roller 131 is mounted upon the lever 126 near the free end thereof, which engages a cam wheel 132, this wheel having a high cam surface 133 and a low cam surface 134 thereon, with the cam wheel being mounted upon and rotating with the main shaft 11 of the loom, and which as the cam 132 rotates, due to the action of the spring 128 imparts an up and down movement to the free end of the lever 126.

A rod 135 is attached to the free end of the lever 126, extends upwardly therefrom and is connected to the arm 85 fixed to the rocker shaft 83 so that during the operation of the loom at predetermined times the members 86 and 87 are oscillated vertically by the cam wheel 132 and moved downward so the guides 90, 90 carry pile thread down into the open warp between and below the fingers 56, 56 and remain momentarily in this position while a shot of filling is placed into the open warp and above the pile threads 70 by the operation of the needle 45.

The operation of the cam wheel 132 is, of course, in timed relation to the operation of other parts of the loom, and particularly with relation to the cam 123 which shifts the members 86 and 87 laterally during the operation of the loom, until the guides 90, 90 are in alignment with the spaces between the fingers 56, 56 before the guides 90, 90 descend, as well as the guides 90a when they are used for the weaving of double loop pile.

Attached to the breastplate 49 is a pair of brackets 137 and 138 which are Z shaped with an elongated portion thereof fitted in face-to-face relation upon the bracket 48 which supports the breastplate 49. The brackets 137 and 138 have blocks 139, 139 mounted therein, in which a shaft 140 is journaled, the blocks 139, 139 being secured in vertical position by bolts 141, 141 engaged with blocks 139, 139 while other bolts 142, 142 extend horizontally through the brackets 137 and 138 and into the blocks 139, 139 to secure blocks 139, 139 to the brackets 138, 138. The shaft 140 has a plurality of guide discs 143 thereon, being spaced apart to receive the fingers 56, 56 and the loops 94, 94 thereby forming guides for the fingers 56, 56 with each disc 143 passing between the rows of loops 94, 94 formed in the fabric as it is woven, thereby serving to keep the fingers 56, 56 in proper alignment and also holding the fabric firmly on the breastplate 49. It is necessary to apply some tension to the pile yarn in order that the loops be formed regularly and snugly around the fingers 56 so there is a pulling force exerted on the fabric and the fingers in an upward direction by the pile yarns 70 and 70a so the guide discs 143 serve to hold the fabric firm, and being adjustable vertically the discs 143 can be separated the proper distance by spacers 144 so the periphery of the discs 143 can engage the base of the fabric if necessary, or adjusted deep or shallow in the fabric to produce the proper friction at the sides of the loops 94, 94 to guide the fingers and hold the fabric in position during the weaving thereof.

The usual take-up roller 145 is provided at the front of the loom over which the fabric passes, a second roller 146 being provided, these two rollers being standard parts of the usual loom and are connected with the let-off and take-up mechanism of the loom not shown, so that the woven fabric after being loomed, and the warp threads prior to being loomed, are kept under constant predetermined tension.

Another method of operation of the loom is illustrated in Figs. 8 to 12 inclusive of the drawings and which show the weaving of a fabric with crossed loop pile which is a particularly effective weave in appearance when pile yarns 70 and 70a of different colors are used, and which may also be used if cut pile is desired. When the loom is operated to produce the crossed loop fabric, the rod 106 is removed from the connection to the forward end of the Z bar 107 and attached to a stud 147 extending upward from the Z member 107 on the opposite side of the pivot point 108 of the Z member 107. As the loom operates and the roller 122 on the lever 119 is in engagement with the high cam surface 123a on the cam 123, a pull is exerted on the rod 116, thereby moving the Z member 107 about its pivot point in a counter-clockwise direction. A thrust force is exerted on each of the rods 105 and 106 which moves the member 86 about its pivot point 88 in a clockwise direction, thereby moving the guide bar 89 carrying the guides 90, 90 to the position shown in Figs. 9 and 10 of the drawings and moving the member 87 in a counter-clockwise direction, which shifts the guide bar 89a in a direction opposite to the movement of the guide bar 89, also as shown in Figs. 9 and 10 of the drawings. The guide bars 89 and 89a are each fixed only to one of the guide bar members 86 and 87 by the studs 89c and 89d as heretofore described and are individually actuated only as the guide bar members 86 and 87 are moved and therefore are shifted independently of each other, in opposite directions for the weaving of crossed pile fabric, and in the same direction for the weaving of either single or double pile fabric. This shifting of the guide bars 89 and 89a crosses the pile yarns 70 and 70a in which position the guides 90 and 90a carry the pile yarns 70 and 70a into the shed of the loom, where the needle 45 places the two strands of filler through the loops thus formed over the fingers 56 at the bottoms thereof and under the fingers 56, 56. After the guides 90 and 90a are withdrawn from the shed of the loom, the reeds 38 beat up the filler and the loops into the fabric. As the roller 119 reaches the low cam surface 123b on the cam 123, the spring 112 rotates the Z member 107 in a clockwise direction, thereby exerting a pull on the rods 105 and 106, thereby moving the member 86 in a counter-clockwise direction and the member 87 in a clockwise direction, thereby moving the guide bars 89 and 89a into the position shown in Figs. 11 and 12 of the drawings, which causes the guides 90 and 90a to again cross the pile yarns 70 and 70a, in which position the guides 90 and 90a again carry the pile yarns between the fingers 56 into the shed of the warp forming loops over the fingers 56, where the needle 45 again places the strands of filler 93 under the fingers 56 and through the loops thus formed, and as the guides 90 and 90a pass upward, the reeds again beat up the filler and loops into the fabric. Between the operations just described, shots of filler are placed in the open shed of the warp which is shedded by the harness in the usual manner.

It will be understood that in the weaving of the fabric bobbins are used (which are not shown) at the marginal edges of the fabrics so the filler threads are firmly and securely anchored at the marginal edges of the fabric, all of which is common practice in the weaving of fabrics.

Figure 15:
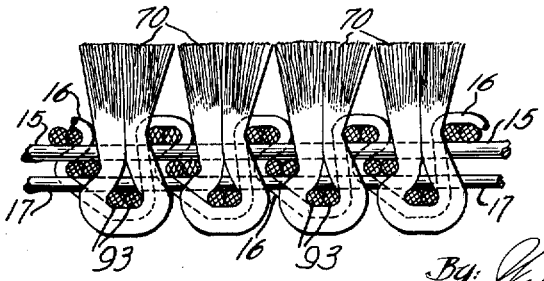
Figure 15 is a vertical sectional view of a piece of fabric produced by my improved loom.

Figures 13 and 15 illustrate a preferred form of fabric woven as a result of a method of weaving known as a three shot cycle, which can be practiced in the loom heretofore described when a single guide bar is used for the insertion of the pile yarn, with the same weave being produced when two guide bars are used, except that two strands of pile yarn are inserted as shown in Figure 14. I prefer to space the warps fillerwise of the loom in groups of three offset fillerwise only very slightly with respect to the warps of each group with the spacing of the groups of warps corresponding generally to the spacing of the fingers 56, 56 on the loom, with each group being under or very closely adjacent to the fingers 56, 56 and composed of two stuffer warp threads 15 and 17 and a binder warp 16. Considering the fabric illustrated in Figure 15 as being produced from the right hand side of the drawing towards the left, the warps are open with 16 up and 15 and 17 down, the filler 93 would be placed through the warp and beat up. Because of the fact that both stuffer warps 15 and 17 are taut and below the filler and only the binder warp 16 is above the filler, when this shot of filler is beat up it goes into the base fabric at a higher level than do the next two succeeding shots of filler. In the next step the warps 15 and 17 are shedded up and the binder warp 16 down, the pile yarn 70 inserted into the shed by the guides 90, 90 and a shot of filler 93 placed over the strands of pile yarn 70 below the stuffer warps 15 and 17 and above the binder warp 16. As the guides 90 descend into the shed, because of the tension on the pile yarn and the fact that the guides 90 have been shogged over the fingers prior to their descent, the pile yarn is looped over the fingers somewhat taut and held in this condition until the shot of filler is made and the needle 45 withdrawn from the shed whereupon the guides 90 ascend drawing the shot of filler previously inserted over the pile yarn against the under side of the fingers 56. The filler and the pile loops are thereupon beat up at a low level in the fabric, with the filler 93 through the base of pile loop, and the pile loop beat snugly against the first mentioned shot of filler. For the next step, the warp 17 is shedded down and the binder warp 15 and stuffer warp 16 are floated, whereupon another shot of filler is placed through the warps, and beat up. When this last mentioned shot of filler is beat up against the loops, the loops are compressed until the strands of yarn composing the loops are together, above the base of the loops, thereby anchoring the pile loop very firmly in the fabric and making its removal very difficult. For the next step the binder warp 15 is shedded down, stuffer warp 16 is shedded upward, and the stuffer warp 17 is floated, and the cycle of operations repeated as the fabric is woven.

A complete cycle of operation is completed with each revolution of the main shaft 11 of the loom. The operating means for the needle 45 is timed to cause the needle 45 to pass through the warp shed three times with each revolution of the main shaft 11 of the loom and the operating means for the heddles 33, 34 and 35 is timed to operate at least one of the heddles after each filler shot is beat up by the lay. The filler inserting needle operating means and the heddle cams and operating parts are not shown or described, as these operating parts are old and well known standard parts of looms used heretofore in the manufacture of fabrics and well known in the art. The movement of the pile guides 90 into and out of the warp shed and the movement of these guides laterally over the fingers 56, thereby shogging the pile yarn over the fingers 56, is performed and controlled by the operating parts for these pile guides in relation to the operation of the needle 45 as it places the filler into the warp.

Figure 2:
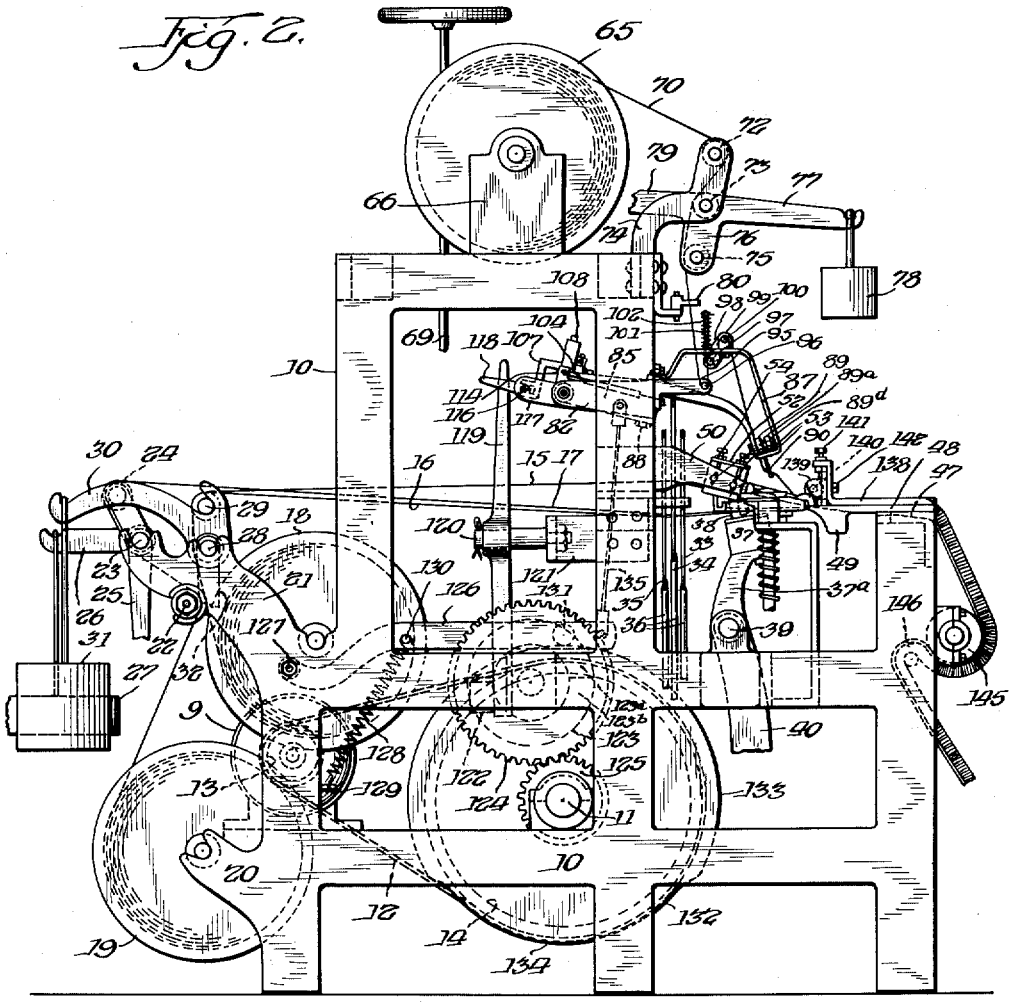
Figure 2 is a side elevational view of the opposite side of the loom.

The wheel 125 has a gear ratio of 2 to 1 with respect to the gear 124, with the cam surfaces 123a and 123b on this gear 124 being of equal length as shown particularly in Fig. 2. The gear 124 is so positioned on its axis that during each cycle of operation the roller 119 passes from one of these surfaces 123a and 123b to the other, thereby shogging the guides 90 over the fingers 56. Each complete revolution of the cam 123 shogs the guides over the fingers twice, but because of the gear ratio of the gear 124 to the gear 125, only one shogging movement of the guides 90 is made with each complete revolution of the main loom shaft 11.

The high cam surface 133 on the cam 132 extends two-thirds of the distance around the periphery of the cam 132, with the low surface 134 extending the other one-third of the distance making up the periphery of this cam 132. As the roller 131 travels on the low surface 134, the guides 90 are forced down into the warp shed and remain in this position long enough for the needle 45 to place the filler 93 through the warp shed below the warps 15 and 17 and above the binder warp 16 and also above the pile yarn strands 70, and as the roller 131 travels up onto the high surface 133 the guides 90 are raised out of the warp shed to the position shown in Fig. 4 of the drawings. At the beginning of each cycle of operation as herein described, the roller 131 is approximately at the center of the high cam surface 133 with the guides 90 out of the shed of the loom, and as the roller 131 reaches the low side 134, the guides descend into the shed of the loom where they remain until a shot of filler is inserted into the shed and over the strands of pile yarn, when the guides 90 are raised by the roller 131, again running into the high position 133 of the cam.

When the single guide bar such as 89 with its set of guides are used, single strands of pile yarn are therefore woven into the fabric with the guides 90 carrying the pile yarn into the warp first on one side of a particular finger and then shifted so the next descent of a guide 90 is on the opposite side of the same finger, thus initially weaving the pile into the fabric from a continuous strand of yarn which is looped over one of the fingers 56 at the upper side of the fabric and also looped on the underside of the fabric, where the filler passes through the loop thus formed at the back of the fabric, and known in the art of weaving as "weaving through to the back."

The double bars 89 and 89a with their guides 90 and 90a may be used in two different ways. They may be shifted as a unit, in which case double pile threads are woven into the fabric instead of single threads. Otherwise, the operation is the same, although producing a pile that is heavier, provided, of course, the same size of pile is used in both instances. If the bars 89 and 89a are shifted in opposite directions, then the pile loops will cross each other as shown in Figs. 9 to 12 of the drawings, which produces fabric of unusual appearance when pile threads of different colors are used either for loops or cut pile. It will be understood that the guides in the bars always alternate on each side of the fingers as well as on each group of warps, and that at least two of the warps pass through the pile loops, when considering the loops as extending from one set of filler threads to the next set of filler threads.

The operation of the loom has hereinabove been described in sufficient detail to enable any weaver to understand its operation so that repetition thereof is believed unnecessary. The particular features which are new in the art of weaving are the mounting of the fingers in front of the heddles, so these fingers do not pass through the heddles and the provision of pile insertion means, which so far as I am aware has not been incorporated in a loom heretofore.

Generally the operation of the loom has the effect of looping the pile thread, the tops of the loops being defined by the fingers 56, 56 and the bottoms of the loops by the filler threads so that if a strand of pile yarn 70 were followed in the initial weave it would describe a series of loops which were formed over the tops of the fingers and under the filler threads. This pile yarn is under tension at all times so that the yarn is drawn fairly snugly around the fingers and being under tension, the slack is kept out of the filler threads during the beating up operation, so that these loops are drawn firmly around the fingers, the width of which controls the height of the loops. The filler threads which extend through the pile loops under the fingers are also snugly drawn up against the under side of the fingers 56, 56 as the pile yarn guides 90 ascend out of the shed of the loom. During the weaving operation several of these loops remain on each of the fingers, producing a certain amount of frictional resistance in addition to the tension on the warp threads against which the reeds beat, thereby providing a very firm and closely woven base fabric with both the warp and the filler yarns fitting snugly about the base of the loops, thereby very smoothly anchoring the pile yarn into the fabric and making it almost impossible to pull out one of the strands of the pile fabric after the cloth is loomed without breaking the yarn, a strip of the woven fabric is thus formed into which the fingers 56 are woven providing a base against which the reed beats at all times thereby insuring close and tight woven fabrics with the pile yarn being under complete control as long as it remains in the fingers.

If a pile having a closed loop is desired the fingers such as 56, 56 are shown having tapered ends over which the loops pass as the fabric is woven, with the guides 140, 140 having discs 143, 143 spaced in such manner that the loops on each side of the fingers can pass between the discs 143, 143 thereby serving to prevent lateral displacement of the fingers 56, 56 during the looming of the fabric.

If it is desired to cut the loops, then the fingers 56, 56 are removed and fingers 63, 63 placed in position so that as the loops pass over the ends of the fingers the knives 64, 64 sever the loops through the crowns and result in the usual pile fabric with the free ends of the yarn forming a pile such as is used in rugs, carpets, and the like. Also, if desired, fingers with the knives therein may be used with fingers without knives, thus producing a fabric with looped pile and regular pile, thus producing a fabric of striped effect of unusual appearance.

Due to the fact that the pile yarn is under tension at all times and there is no opportunity for it to slip or move out of position during the weaving, the pile loops are even in height and when severed by the knives are cut across the crowns, so that in effect a fabric is produced which needs very little, if any, trimming in order to produce a fabric having an even pile, which has not been true with the looming machines heretofore used for this kind of fabric, so that substantially all waste is eliminated during the looming operation and very little waste results from the trimming operation and inasmuch as there is no possible chance for the pile yarn to slip out of position, each pile loop placed into position in the fabric, which results in very little of the burling operation being necessary, thereby producing from the loom a substantially perfect fabric which results not only in lower cost of manufacture, but also in saving of material and in increase of speed with which the looming operation can be performed.

The spacing of the fingers 56, 56 may be varied as desired, as well as the distance which the pile insertion guides 90, 90 may travel fillerwise, depending entirely upon the character of the weave desired, such as thickness of the pile, the denseness thereof, and the weight and character of the pile yarn, and other factors, all of which are within the knowledge and skill of the ordinary weaver.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. A loom attachment for weaving pile fabrics comprising in combination with a loom, a series of spaced fingers mounted on the loom forward of the harness and extending parallel with the [warp] *warps, there being a respective group of said warps adjacent each of said fingers,* a series of spaced pile yarn feeding guides having eyelets therein through which strands of pile yarn are threaded movably mounted above the spaced fingers, means whereby the said feeding guides are shifted transversely *across respective groups of warps* to predetermined positions above the spaced fingers and moved into and out of the [warp] *warps* whereby the pile yarn is looped over the spaced fingers *and over respective groups of warps,* and means for beating up the loops thus formed as the fabric is woven.

2. A loom attachment for weaving pile fabrics comprising in combination with a loom, a series of spaced fingers mounted on the loom forward of the harness secured at one of their ends and free at their opposite ends and extending parallel with the [warp] *warps, there being a respective group of said warps adjacent each finger,* a series of pile yarn feeding guides having eyelets therein through which strands of pile yarn are threaded movably mounted above the spaced fingers, means whereby the said feeding guides are shifted transversely *across respective groups of warps* to predetermined positions and moved vertically into and out of the [warp] *warps* whereby the pile yarn is looped over the spaced fingers *and respective groups of warps* and carried into the [warp] *warps* between the said fingers, and means for beating up the loops thus formed as the fabric is woven.

3. A loom attachment for weaving pile fabrics comprising in combination with a loom, spaced fingers mounted on the loom forward of the harness secured at one of their ends and free at the other, pile yarn guides having eyelets adjacent the ends thereof through which strands of pile yarn are threaded mounted above the fingers and adapted to extend between the fingers and between the warp threads, means independent of the said fingers whereby the said guides are moved vertically and laterally whereby the pile yarn carried by said guides is threaded over the fingers *and over groups of the warp threads* and into the warp, means whereby filler threads are threaded through the loops thus formed and means on the loom whereby the pile loops and filler threads are beat up into fabric.

4. A loom attachment for weaving pile fabrics comprising in combination with a loom, spaced fingers mounted forward of the harness and extending parallel with the warp and having free ends terminating over the breast plate of the loom, reciprocating pile yarn guides having eyelets therein through which strands of pile yarn are threaded mounted above and independently of the fingers, means whereby the guides are shifted laterally *across and above the fingers and corresponding warp threads* to predetermined positions, means whereby the said guides are moved vertically between the fingers into the warp threads thereby forming continuous loops, means whereby filler threads are placed in said loops below the fingers and between the warp threads, and means associated with the loom for beating the loops and filler threads into position in the warp.

5. A loom attachment for weaving pile fabrics comprising in combination with a loom, a fixed bar extending transversely of the loom mounted forward of the harness, spaced fingers fixed at one of their ends to said bar and free at their other ends extending substantially parallel with the warp, movable pile yarn guides having eyelets therein adjacent their free ends through which strands of pile yarn are threaded mounted above the fingers and carrying pile yarn, *there being at least one finger corresponding to each pile yarn guide,* means whereby the guides are shifted to predetermined lateral positions *across and above corresponding fingers and groups of warp threads,* means whereby the said guides are moved into position into the warp between the fingers and means in said loom for threading filler threads into the loops of pile yarn below the fingers formed by the said guides.

6. A loom attachment for weaving pile fabrics comprising in combination with a loom, a fixed bar extending fillerwise of the loom mounted forward of the harness, [means whereby the said bar may be adjusted to varying angular positions,] spaced fingers fixed at one of their ends to said bar and free at the other extending substantially parallel with the warp, the free ends of the fingers being tapered and terminating over the breast plate of the loom, movable pile guides carrying pile yarn mounted over the said fingers, *there being at least one finger corresponding to each guide, means whereby each guide is alternately shifted in opposite directions laterally across and above each finger while in raised*

*position, means whereby the said guides are lowered from raised position* [means whereby the guides are shifted to predetermined lateral positions, means whereby the said guides are moved vertically] into position into the warp between the fingers *and then returned to raised position following each lateral shifting movement of the guides in each direction,* and means in said loom for threading filler threads into the loops of pile yarn formed by the said guides below the said fingers.

7. A loom attachment for weaving pile fabrics comprising in combination with a loom, a fixed bar extending fillerwise of the loom mounted forward of the harness, [bars fixed to the frame of the loom to which the said fixed bar is secured at its ends, means whereby the angular position of the fixed bar can be changed,] spaced fingers fixed at one of their ends to said bar and free at the other, extending substantially parallel with the warp, the free ends of the fingers being tapered and terminating over the breast plate of the loom, movable pile guides carrying pile yarn mounted over the said fingers, means whereby the guides are *alternately shifted in opposite directions laterally across and above the fingers while in raised position,* [shifted to predetermined lateral positions,] means whereby the said guides are moved *downwardly* [vertically] into position into the warp between the fingers *and then returned to raised position following each lateral shifting movement of the guides in each direction,* and means in said loom for threading filler threads into the loops of pile yarn formed by the said guides below the said fingers.

8. A loom attachment for weaving pile fabrics comprising in combination with a loom, a bar extending fillerwise of the loom, spaced fingers fixed at one of their ends to said bar and free at the other, extending substantially parallel with the warp, movable pile yarn guides having eyelets therein through which the pile yarn is threaded mounted above the said fingers and spaced relative thereto and carrying pile yarn, means whereby the guides are *alternately shifted in opposite directions laterally across and above the fingers while in raised position,* [shifted to predetermined lateral positions,] means whereby the said guides are moved *downwardly* [vertically] into position into the warp *between the fingers and then returned to raised position following each lateral shifting movement of the guides in each direction, and means on said* [between the fingers, a non-yielding fabric holding and guiding member spanning the free ends of the said fingers mounted on the breast beam of the loom, and means on said] loom for threading filler threads into the loops of pile yarn formed by the said guides *below said fingers.*

9. A loom attachment for weaving pile fabrics comprising in combination with a loom, a bar extending fillerwise of the loom, spaced fingers fixed at one of their ends to the said bar and free at the other, extending substantially parallel with the warp, movable pile yarn guides [having eyelets therein adjacent their free ends] through which strands of pile yarn are threaded mounted above the said fingers and spaced relative thereto [and carrying pile yarn], means whereby the guides are *alternately shifted in opposite directions laterally across and above the fingers while in raised position,* [shifted to predetermined lateral positions,] means whereby the said guides are moved into position into the warp between the *fingers and then returned to raised position following each lateral shifting movement of the guides in each direction,* [fingers, a combined non-yielding fabric holding and guiding member spanning the free ends of the fingers and in engagement with the rows of loops formed on each finger,] and means on said loom for threading filler threads into the loops of pile yarn formed by the said guides *below the fingers.*

10. A loom attachment for weaving pile fabrics comprising in combination with a loom, a *plurality of* [bar extending fillerwise of the loom,] spaced fingers [fixed at one of their ends to the said bar and free at the other,] extending substantially parallel with the warp, movable pile guides having eyelets adjacent their ends through which strands of pile yarn are threaded mounted above the said fingers, and spaced relative thereto, means whereby the guides are *alternately shifted in opposite directions laterally across and above the fingers while in raised position,* [shifted to predetermined lateral positions,] means whereby the said guides are moved *downwardly* into position into the warp between the [fingers,] *fingers and then returned to raised position following each lateral shifting movement of the guides in each direction, and* means on said loom for threading filler threads into the loops of pile yarn formed *beneath said fingers by the said guides* [by the said guides, and a rotatable non-yielding hold down and spacing member mounted on the breast beam of the loom having spaced discs thereon between which the free ends of the fingers extend].

11. A loom attachment for weaving pile fabrics comprising in combination with a loom, a bar extending transversely of the loom, spaced fingers fixed at one of their ends to the said bar and free at the other, extending substantially parallel with the warp, knives in said fingers adjacent the free ends thereof at their upper edges, movable pile guides having eyelets adjacent their free ends through which pile yarn is threaded *there being one of said guides* mounted over [the] *each of* said fingers, means whereby the guides are *each* shifted laterally to predetermined positions *across and above a corresponding finger and a corresponding group of warp threads,* means whereby the said guides are moved into position into the warp between the fingers, and means on said loom for threading filler threads into the loops of pile yarn formed by the said guides.

12. In combination with a loom for weaving pile fabrics comprising in combination, a bar extending transversely of the loom in front of the harness, a plurality of fingers mounted in said bar extending substantially parallel with the warp fixed at one of their ends and free at the other, *there being a group of warp threads adjacent and beneath each of at least some of said fingers,* pile thread guide bar frames movably mounted on the loom, a guide bar in said frames *spaced above and* spanning the spaced fingers, pile thread guides in said *guide* bar, *there being a pile thread guide for each finger,* means whereby the guide bar frames are oscillated vertically at predetermined times, means whereby the said *guide bar is alternately moved laterally in opposite directions to move each of said pile thread guides across and above the corresponding* [guide bar is moved laterally] *finger and the adjacent group of warp threads* to position the pile thread guides before the downward movement of the said frames whereby [the] *each* pile thread [guides pass] *guide passes alternately* on opposite sides of the *corresponding* [fingers] *finger and the adjacent group of warp threads* with [each] successive operations and means in said loom whereby filling threads are placed through the loops of pile on the under side of the said fingers.

13. In combination with a loom for weaving pile fabrics comprising in combination a bar extending transversely of the loom in front of the harness, a plurality of fingers mounted in said bar extending substantially parallel with the warp, fixed at one of their ends and free at the other in spaced relation with each other, a rocker shaft extending transversely of the said loom, *said loom having a power shaft for driving the loom,* pile thread guide bar frames pivotally mounted on said rocker shaft for lateral movement, a guide bar mounted in said frames and spanning the said fingers, pile thread guides in spaced relation in said guide bar, means connecting the rocker shaft and the power shaft of the loom whereby the guides are moved vertically and means whereby the said pile guide bar frames are shifted laterally to predetermined positions prior to the descent of the pile thread guides at each operation of the loom.

14. A loom attachment for the weaving of pile fabric in combination with a loom, a fixed bar extending transversely of the loom, fingers spaced from each other mounted at one of their ends in said bar, rocker means having arms thereon in said loom, pile guide bar frames pivotally mounted intermediate their ends upon the said arms, pile guide bars in said pile guide bar frames spanning the said fingers, pile guides in said bars, and means whereby the said guide bar frames are actuated to shift the pile guides laterally and also move the said pile guides into and out of the warp of the loom.

15. A loom attachment for weaving pile fabric comprising in combination with a loom, a bar extending fillerwise of the loom, a plurality of spaced fingers extending substantially parallel with the warp fixed in said bar at one of their ends and free at their other ends, *there being a group of warp threads beneath each of at least some of said fingers,* a rocker member, guide bar support [frames] *members* mounted upon said rocker member, pile guide bars mounted in said [frames] *support members* spanning the said fingers, a plurality of spaced pile thread guides in said pile guide bars, actuating means on the loom and connecting means operated by the said actuating means, whereby the said guide bar support members and guide bars are oscillated vertically and shifted laterally during predetermined cycles of operation of the loom, *and each of said pile thread guides being movable across and above one of said fingers and one of said groups of warp threads when shifted laterally with said guide bars.*

16. A loom attachment for weaving pile fabric comprising in combination with a loom, a finger support member extending transversely of said loom forward of the harness, fingers mounted in said support member in spaced relation with each other extending warpwise of the loom, *there being a group of warp threads beneath each of at least some of said fingers,* a shaft extending transversely of the said loom, guide bar [frames] *members* movably mounted on said shaft, extending forwardly and downwardly therefrom, a guide bar spanning the said fingers mounted in said guide bar members, spaced *pile yarn* guides, *one corresponding to each finger, mounted* in said guide bar, and operating connections for said guide bar members for vertical and lateral movement of the said guide bar members, whereby [the] *each of* said guides [are] *is* moved into and out of the warp and alternately on opposite sides of the *corresponding* [fingers] *finger and the group of warp threads therebeneath.*

17. A loom attachment for weaving pile fabric comprising in combination with a loom, a finger support member extending transversely of said loom forward of the harness, fingers mounted in said support member in spaced relation with each other extending warpwise of the loom, *there being a group of warp threads beneath each of said fingers,* a shaft extending transversely of the said loom, having arms extending radially therefrom, guide bar members movably mounted on said arms, extending forwardly and downwardly therefrom, a guide bar spanning the said fingers mounted in said guide bar members, spaced guides in said guide bar and operating connections for said guide bar members for vertical and lateral movement of the said guide bar members, whereby the said guides are moved into and out of the warp and alternately on opposite sides of the fingers *and respective groups of warp threads.*

18. A loom attachment for weaving pile fabric comprising in combination with a loom, a finger support member extending transversely of said loom forward of the harness, fingers mounted in said support member in spaced relation with each other extending warpwise of the loom, a shaft extending transversely of the said loom, having arms extending radially therefrom, guide bar members movably mounted on said arms intermediate their ends, extending forwardly and downwardly therefrom, a guide bar spanning the said fingers mounted in said guide bar members, spaced guides in said guide bar and operating connections for said guide bar members for vertical and lateral movement of the said guide bar members, whereby the said guides are moved into and out of the warp and alternately on opposite sides of the fingers.

19. A loom attachment for weaving pile fabric *from warps, fillers and pile yarns* comprising, in combination with a loom *having a main loom shaft,* a bar extending fillerwise of the loom *and disposed rearwardly of the fell of the fabric,* a plurality of spaced fingers extending substantially parallel with the warp fixed at [one of] their *rear* ends to the said bar, knives in said fingers adjacent their *front* ends, a rocker member, a pair of frames pivotally mounted on said rocker member, a pile guide bar on said frames spanning the said fingers, a plurality of spaced pile thread guides in said pile guide bar, cams on the main loom shaft and a plurality of connecting means operated by said cams whereby the said frames and pile guide bar are moved vertically and laterally during predetermined cycles of operation of the loom, *said cams being arranged to alternately move said pile guide bar laterally in opposite directions while said thread guides are in raised position only above said fingers and to move said guides downwardly into the warps and then back to raised position between successive lateral movements of said guide bar.*

20. A loom attachment for weaving pile fabric comprising in combination with a loom a plurality of spaced fingers free of the harness and reed of the loom extending substantially parallel with the warp fixed at one of their ends, *each finger being arranged to overlie a separate group of warp threads,* knives mounted in said fingers whereby the loops formed therein are severed as the loops pass over the fingers, a rocker member, a pair of guide bar frames pivotally mounted on said rocker member, a pile guide bar on said frames spanning the said fingers, a plurality of spaced pile thread guides in said pile guide bar, cams connected with the main loom shaft and connecting means with the said frames operated by the said cams whereby the said guide bar frames and guide bar are moved vertically and *are alternately* shifted laterally *in opposite directions across and above the fingers and their respective groups of warp threads* during predetermined cycles of operation of the loom.

21. A loom attachment for weaving pile fabric comprising with a loom a bar extending transversely of the loom forward of the harness, a plurality of spaced fingers extending substantially parallel with the warp fixed at one of their ends and free at their other ends, knives mounted in said fingers along their upper edges adjacent the free ends thereof whereby the loops formed on said fingers are severed before leaving the said fingers, a rocker shaft extending transversely of the loom, arms on said rocker shaft, frames pivotally mounted on said arms and extending forward and downward from the said arms, a pile guide bar on said frames spanning the said fingers, a plurality of spaced pile thread guides in said pile guide bar, cams connected with the main loom shaft and connecting means with the said frames operated by the said cams whereby the said frames are oscillated vertically and shifted laterally during predetermined cycles of operation of the loom.

22. A loom attachment for weaving pile fabric comprising in combination with a loom a bar extending transversely of the said loom forward of the harness, a plurality of spaced fingers mounted in the said bar extending substantially parallel with the warp fixed at one of their ends and free at their other ends, a rotatable guide member having spaced discs thereon between which the free ends of the fingers extend, a rocker shaft having fixed arms thereon, a pair of members pivotally mounted intermediate their ends on the arms in the said rocker shaft extending forward and downward therefrom, a pile guide bar on said members spanning the said fingers, a plurality of spaced pile thread guides in said pile guard bar, cams connected with the main loom shaft and a plurality of connecting means operated by the said cams whereby the said members are oscillated vertically and shifted laterally during predetermined cycles of operation of the loom.

23. A loom attachment for weaving pile fabric comprising in combination with a loom a bar extending fillerwise of the loom forward of the harness, a plurality of spaced fingers extending substantially parallel with the warp fixed at one of their ends, the said fingers being wider at their free ends than at other portions, knives in said widened portions of the said fingers, guiding means for the fingers, rocker means extending transversely of the said loom, a pair of frames pivotally mounted for lateral movement on said rocker means, a pile guide bar on said frames spanning the said fingers, a plurality of spaced pile thread guides in said pile guide bar, cams connected with the main loom shaft and a plurality of connecting means operated by the said cams whereby the said frames are oscillated vertically and shifted laterally during predetermined cycles of operation of the loom.

24. A loom attachment for weaving pile fabric comprising in combination with a loom a plurality of spaced fingers extending substantially parallel with the warp fixed at one of their ends and free at their other ends, and a guide roller having circumferential channels therein, the said walls of the channels extending between the fingers and spaced therefrom to allow fabric loops to pass between the said side walls, rocker means, a pair of frames pivotally mounted on said rocker means, a pile guide bar on said frames spanning the said fingers, a plurality of spaced pile thread guides in said pile guide bar, cams connected with the main loom shaft and a plurality of connecting means operated by the said cams, whereby the said frames are oscillated vertically and shifted laterally during predetermined cycles of operation of the loom.

25. A loom attachment for weaving pile fabric comprising in combination with a loom a bar extending fillerwise of the loom, a plurality of spaced fingers extending substantially parallel with the warp fixed to the said bar at one of their ends and free at their other ends, a guide roller having spaced discs thereon between which the free ends of the fingers extend, the said discs being spaced sufficiently to permit the loops formed on the fingers to pass therebetween, a rocker shaft having fixed arms thereon, pile guard bar members mounted on said arms, a pile guide bar on said pile guide bar members, a plurality of spaced pile thread guides in said pile guide bar, cam means connected with the main loom shaft, and a plurality of connecting means operated by the said cam means whereby the said frames are oscillated vertically and shifted laterally during predetermined cycles of operation of the loom.

26. A loom attachment for weaving pile fabric comprising in combination with a loom a bar extending fillerwise of the loom, a plurality of spaced fingers extending substantially parallel with the warp fixed at one of the ends to the said bar and free at the other, rocker means mounted on the loom, pile thread guide bar frames pivotally mounted on said rocker means, a pile thread guide bar in said [members] *frames,* a plurality of spaced pile thread guides in said bar, a cam on the main drive shaft of the loom, a pivotally mounted lever actuated by the cam, a connection to the said rocker shaft whereby with the rotation of the cam the pile guides carry pile yarn between the fingers and into the open warp, a face cam connected with the said drive shaft, a pivotally mounted lever in engagement at one of its ends with the face cam, and connections between the lever and the guide bar frames whereby at predetermined times the pile thread guides are moved laterally, whereby with each descension in the warp the said pile guides pass on opposite sides of the fingers whereby loops are formed over the said fingers and anchored into the fabric by the filler and warp threads.

27. A loom attachment for weaving pile fabric comprising in combination with a loom, a bar extending fillerwise of the loom, spaced fingers mounted at one of their ends on said bar extending warpwise of the loom, rocker means extending fillerwise of the loom, pile guide bar support frames mounted on said rocker means, guide bars supported by the said frames, pile guides in said bars, one of said pile guide bars being secured to one of said frames and the other guide bar to the other frame, and operating means for said pile guide frames, whereby they are moved vertically and shifted horizontally and cause the pile guides to pass alternately on each side of the said fingers into the open warp on the loom.

28. A loom attachment for weaving pile fabric comprising in combination with a loom, a bar extending fillerwise of the loom, spaced fingers mounted at one of their ends on said bar extending warpwise of the loom, a rocker shaft extending fillerwise of the loom, arms on said shaft, [a] pile guide bar support frames mounted on said arms, pile guide bars in said frames, pile guides in said bars, one of said pile guide bars being secured to one of said frames and the other guide bar to the other frame, whereby they are moved vertically and shifted horizontally and cause the pile guides to pass alternately on each side of the said fingers into the open warp on the loom, the said pile guide bars being mounted on said frames in side to side relation with each other and movable independently of each other.

29. A loom attachment for weaving pile fabrics *from weft threads, groups of warp threads and pile yarn strands* comprising in combination with a loom, spaced fingers mounted thereon extending warpwise of the loom *and each overlying a group of warp threads,* vertically and horizontally movable pile guide bars positioned above the said fingers and above the shed of the loom, pile yarn guides in said bars having eyelets adjacent the ends thereof through which strands of pile yarn are threaded, and means connecting the said pile guide bars with the said loom, whereby a plurality of strands of yarn is shogged over the said fingers *and respective groups of warp threads* and *is* threaded between said fingers into the shed of the loom and interwoven with the base fabric during the weaving thereof by the loom, *said guide bar being movable in one direction laterally of the warp threads while in raised position following alternate upward movements of said guides and being movable in the opposite direction following intervening upward movements of said guides between said alternate movements.*

30. In combination with a loom for weaving pile fabric *from weft yarns, groups of warp yarns and pile yarns,* comprising in combination, a plurality of spaced fingers extending warpwise of the loom and mounted on the said loom, *each finger extending over a group of said warp yarns,* a set of spaced pile [thread] *yarn* guides having pile yarn receiving eyelets adjacent the ends thereof mounted above the said fingers above the shed of the loom, the spacing of the guides corresponding approximately with the spacing of the fingers, vertical actuating members for said guides whereby the said guides are moved into and out of the shed of the loom, and means whereby [each of the] said guides are shifted *across and above the fingers and respective groups of warp yarns and* to predetermined positions above the spaces between the said fingers prior to each descent of the guides into the shed of the loom, *said guides being shifted in one direction prior to each alternate descent thereof and in the opposite direction prior to each intervening descent thereof.*

31. A method which comprises arranging warp threads in a loom having movable beating means in spaced groups each group comprising stuffer warps and a binder warp, each warp being spaced slightly fillerwise with respect to other warps in the same group, at least one warp of each group being a binder warp and at least two of the warps being stuffer warps, placing a filler through the warp under the binder warp, threading *strands* of pile yarn under tension over fingers and into the warp on each side of each group of warp threads and entirely in advance of the [heating] *beating* means, placing filler [yarn] through the loops of pile formed on the fingers below the stuffer warps and above the binder warp, drawing the strands of pile yarn snugly over the fingers and the filler against the under edges of the fingers, shedding one of the stuffer warps and floating the balance of the warps, inserting a filler [thread] and beating up the last mentioned filler directly against one side of the loops of pile yarn.

32. A method which comprises arranging warp threads in a loom having movable beating means in spaced groups, each group comprising a plurality of warps spaced fillerwise only slighty with respect to other warps in the same group, at least one warp of each group being a binder warp and at least two of the warps being stuffer warps, placing a filler through the warp under the binder warp, threading pile yarn under tension over finger and into the warp on each side of each group of warp threads and entirely in advance of the beating means, placing filler yarn through the loops of pile formed on the fingers below the stuffer warps and above the binder warp, drawing the pile yarn snugly over the fingers and the filler against the under edges of the fingers, shedding one of the stuffer warps and floating the balance of the warps, inserting a filler thread and beating up the last mentioned filler directly against one side of the loops of pile yarn and thereafter cutting the pile loops as the loops are forced towards the ends of the fingers during successive weaving operations.

33. A method which comprises arranging warp threads in a loom having movable beating means in spaced groups, each group consisting of a plurality of warps in side to side relation with each other and offset only slightly in a fillerwise direction with respect to each adjacent warp of each group, at least one warp of each group being a binding warp and at least two of the warps being stuffer warps, placing a filler through the warp under the binding warp, threading a plurality of strands of pile yarn under tension over fingers and into the shed of the warp in each side of each group of warp threads and entirely in advance of the beating means placing filler yarn through the loops of pile formed on the fingers below the stuffer warps and above the binding warp, drawing the pile yarn snugly over the fingers and around the filler yarn, shedding one of the stuffer warps and floating the balance of the warps, beating the loops thus formed and the filler yarn against the previously formed fabric, inserting a filler [thread] *yarn* and beating up the last mentioned filler *yarn* directly against one side of the loops of pile yarn.

34. A method which comprises arranging warp threads in a loom having movable beating means in spaced groups, each group consisting of a plurality of warps in side to side relation with each other and offset only slightly in a fillerwise direction with respect to each adjacent warp of each group, at least one warp of each group being a binding warp and at least two of the warps being stuffer warps, placing a filler through the warp under the binding warp, threading a plurality of strands of pile yarn under tension over fingers in the same direction and into the warp on each side of each group of warp threads and entirely in advance of the beating means, placing filler [yarn] through the loops of pile formed on the fingers below the stuffer warps and above the binding warp, drawing the pile yarn snugly over the fingers and the filler against the underside of the fingers, shedding one of the stuffer warps and floating the balance of the warps, inserting a filler [thread] and beating up the last mentioned filler directly against one side of the loops of pile yarn.

35. A method which comprises arranging warp threads in a loom having movable beating means in spaced groups, each group consisting of a plurality of warps in side to side relation with each other and offset only slightly in a fillerwise direction with respect to each adjacent warp of each group, at least one warp of each group being a binder warp and at least two of the warps being stuffer warps, placing a filler through the warp under tension under the binding warp, threading a plurality of strands of pile yarn over fingers in opposite directions and into the warp on each side of each group of warp threads, and entirely in advance of the beating means, placing filler [yarn] through the loops of pile formed on the fingers below the stuffer warps and above the binding warp, shedding one of the stuffer warps and floating the balance of the warps, inserting a filler [thread] and beating up the last mentioned filler directly against one side of the loops of pile yarn.

36. A method of weaving pile fabrics on a loom having movable beating means which comprises weaving *groups of* [warp] *warps* and filler yarn into a base fabric and concurrently with the weaving of the base fabric interweaving pile yarn into the fabric by shogging strands of pile yarn over warpwise extending fixed fingers *and over respective groups of warps,* threading the strands of pile yarn between the fingers, *between adjacent groups of warps* and entirely forwardly of the beating means into the shed of the loom below the path of the filler inserting means, inserting filler [strands] *yarn* over the pile yarn and through the open shedded [warp] *warps,* again threading the pile yarn upward between the fingers, thereby looping the pile yarn around the filler *yarn,* keeping the pile yarn under tension whereby the loops thus formed are drawn snugly around the fingers with the filler, and beating up the filler and pile loops against the previously formed fabric held in frictional engagement with the said fingers.

37. A method *of* weaving pile fabrics on a loom having movable beating means which comprises weaving a base fabric of the usual warp and filler threads and concurrently weaving pile yarn into the base fabric by shogging pile yarn over fixed warpwise extending fingers *and over respective groups of two or more warp threads,* threading pile yarn between the fingers and the adjacent groups of warp threads and entirely forwardly of the beating means to a point below the path of the filler thread insertion means, placing filler threads over the pile yarn and between certain of the warps, drawing the pile yarn upward between the fingers, keeping the pile yarn under tension whereby continuous loops are formed over the fingers and filler yarns in snug frictional engagement with the *fingers* [*finger*], *and* beating up the yarn thus positioned against previously formed fabric against the frictional resistance of the loops and filler on the fingers and the tension of the warps.

38. A method of weaving pile fabrics on a loom having a movable beating means which comprises weaving a base fabric of the usual warp and filler threads and concurrently weaving pile yarn into the base fabric by shogging pile yarn over fixed warpwise extending fingers *and over respective groups of at least two warp threads,* threading pile yarn between the fingers and [the] *between adjacent groups of* warp threads and entirely forwardly of the beating means to a point below the path of the filler thread insertion means, placing filler threads over the pile yarn and between certain of the [warps] *warp threads,* drawing the pile yarn upward between the fingers, keeping the pile yarn under tension whereby continuous loops are formed over the fingers and filler *threads* [yarn] in snug frictional engagement with the

*respective fingers* [finger], beating up the yarn thus positioned against previously formed fabric against the frictional resistance of the loops and filler *threads* on the fingers and the tension of the [warps] *warp threads* and retaining [in] *on* the fingers a plurality of loops whereby an area in the fabric forms a base against which subsequent fabric is formed in addition to the tension provided by the warp threads.

39. In combination with a loom for weaving a base fabric composed of a plurality of warp and filler threads, a series of fingers extending parallel with the warp in spaced relation with each other, a series of rod like pile thread guides mounted above the said fingers, means whereby the said pile thread guides are moved vertically between the spaced fingers into and out of the shed of the loom at predetermined times, means whereby the said pile thread guides are shogged over the said fingers *and over certain of the warp threads* prior to their descent into the shed of the loom and means whereby pile yarn is supplied to said guides.

40. In combination with a loom for weaving pile fabrics comprising means whereby a base fabric is woven of *groups of* warp *threads* and filler threads, a series of fingers extending warpwise of the loom *above respective groups of warp threads* and in spaced relation with each other fillerwise of the loom, rod like pile yarn guides having eyelets therein vertically movable into and out of the shed of the loom between the fingers, *between adjacent groups of warp threads* and below the path of travel of the filler thread inserting means and laterally movable over the said fingers, means whereby the said guides are actuated laterally and vertically, and pile yarn supply means, the said guides serving to shog the pile yarn over the fingers *and over respective groups of warp threads* and to carry the said pile yarn below the path of the filler inserting means whereby the filler is placed over the pile yarn.

41. In combination with a loom for weaving pile fabrics comprising means whereby a base fabric is woven of *groups of* warp *threads* and filler threads, a series of fingers extending warpwise of the loom *above respective groups of warp threads* and in spaced relation with each other fillerwise of the loom, rod like pile yarn guides having eyelets therein adjacent their ends vertically movable into and out of the shed of the loom between the fingers, *between adjacent groups of warp threads* and below the path of travel of the filler thread inserting means and laterally movable over the said fingers *and over the respective groups of warp threads,* means whereby the said guides are actuated laterally and vertically, [and] pile yarn supply means, and tension means for said pile yarn.

42. In combination with a loom for weaving pile fabrics comprising means whereby a base fabric is woven of *groups of* warp *threads* and filler threads, a series of fingers extending warpwise of the loom *above respective groups of warp threads* and in spaced relation with each other fillerwise of the loom, rod like pile yarn guides having eyelets therein vertically movable into and out of the shed of the loom between the fingers, *between adjacent groups of warp threads* and below the path of travel of the filler thread inserting means and laterally movable over the said fingers, means whereby the said guides are actuated laterally and vertically, pile yarn supply means, and means whereby the pile yarn is placed under tension, the said guides serving to shog the pile yarn over the fingers *and over respective groups of warp threads* and into the shed of the loom below the path of travel of the filler thread inserting means thereby forming a series of loops over the fingers *and respective warp threads* and around the filler inserted over the said pile yarn.

43. In combination with a loom for weaving pile fabrics comprising means whereby a base fabric is woven of *groups of* warp *threads* and filler threads, a series of fingers extending warpwise of the loom *above respective groups of warp threads* and in spaced relation with each other fillerwise of the loom, rod like pile yarn guides having eyelets therein vertically movable into and out of the shed of the loom, between the fingers *and adjacent groups of warp threads* and below the path of travel of the filler thread inserting means and laterally movable over the said fingers, means whereby the said guides are actuated laterally and vertically, pile yarn supply means, and pile yarn tension means, the said guides threading the pile yarn in the fingers and into the shed of the loom below the path of the filler inserting means whereby a series of loops are formed over the fingers *and over respective groups of warp threads and* in frictional engagement [therewith] *with the fingers, thereby* providing resistance to the movement of the fabric through the loom and *providing* a background for beating up the fabric in addition to the usual tension of the warp threads.

44. A loom attachment for weaving pile fabrics comprising in combination with a loom, a series of spaced fingers mounted on the loom and extending parallel with the warp, *there being a group of warps adjacent each finger,* a series of spaced substantially rigid pile yarn feeding guides having eyelets therein through which strands of pile yarn are threaded movably mounted at a different level than the spaced fingers, means for shifting said feeding guides transversely in unison to predetermined positions laterally of said spaced fingers *and the respective groups of warps,* means for moving said feeding guides into and out of the warp whereby the pile yarn is looped over the spaced fingers *and over the respective groups of warps,* and means for beating up the loops thus formed as the fabric is woven.

*45. In a loom for weaving pile fabrics from ground warps, wefts and pile yarns, said loom having a beating means for beating the wefts against the fell of the fabric, and a series of spaced warpwise extending pile-loop-forming fingers extending over the fell, the combination therewith of a series of pile yarn guides corresponding to said fingers and through which pile yarns extend from the fell to a source of said pile yarns, means to lower said guides from a raised position above the level of the fingers into the warps and to return said guides to said raised position, means to shog each of said guides laterally above and across a corresponding finger in one direction prior to each alternate descent of said guides, and said last-named means being operable to shog each of said guides laterally above and across the corresponding finger in the opposite direction prior to each intervening descent of said guides between said alternate descents thereof.*

References Cited in the file of this patent or the original patent

UNITED STATES PATENTS

| | | |
|---|---|---|
| 506,467 | Britain | Oct. 10, 1893 |
| 762,526 | Hartley | June 14, 1904 |
| 778,363 | Hartley | Dec. 27, 1904 |
| 791,678 | Dustin | June 6, 1905 |
| 1,054,969 | Le Doux | Mar. 4, 1913 |
| 1,739,181 | Robertson | Dec. 10, 1929 |
| 1,797,058 | Gero | Mar. 17, 1931 |
| 1,934,827 | Shuttleworth | Nov. 14, 1933 |
| 2,043,165 | Hall | June 2, 1936 |
| 2,075,187 | Fligg | Mar. 30, 1937 |

FOREIGN PATENTS

| | | |
|---|---|---|
| 205,130 | Great Britain | Oct. 17, 1923 |
| 407,364 | Great Britain | Mar. 16, 1934 |